United States Patent
Kocanda et al.

(10) Patent No.: US 7,832,946 B2
(45) Date of Patent: *Nov. 16, 2010

(54) TRANSPORT SYSTEM FOR MONITORING INDUSTRIAL PROCESSES

(75) Inventors: Robert F. Kocanda, Bloomingdale, IL (US); Roger N. Schmidt, Edina, MN (US); Justin M. Sheard, Brooklyn Park, MN (US); William M. Volna, Minneapolis, MN (US); Manuel S. Alvarez, Warrenton, VA (US); Charles E. Lane, III, Meadowbrook, PA (US); Larry A. Hain, Chalfont, PA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/576,072

(22) Filed: Oct. 8, 2009

(65) Prior Publication Data
US 2010/0021154 A1    Jan. 28, 2010

Related U.S. Application Data

(62) Division of application No. 11/322,528, filed on Dec. 30, 2005, now Pat. No. 7,641,402.

(51) Int. Cl.
*G03B 17/00* (2006.01)
(52) U.S. Cl. .................................................. 396/427
(58) Field of Classification Search ............ 396/419, 396/427, 428; 348/82, 83; 49/139; 901/47
See application file for complete search history.

(56) References Cited

U.S. PATENT DOCUMENTS

| | | | |
|---|---|---|---|
| 3,021,386 A | 2/1962 | Clark | |
| 4,657,728 A | 4/1987 | Coppa et al. | |
| 4,815,757 A * | 3/1989 | Hamilton | 280/764.1 |
| 4,913,458 A | 4/1990 | Hamilton | |
| 5,835,806 A | 11/1998 | Kautz | |
| 5,842,069 A | 11/1998 | Konno | |
| 6,325,621 B1 | 12/2001 | Murasaki et al. | |
| 7,641,402 B2 * | 1/2010 | Kocanda et al. | 396/427 |
| 2004/0212675 A1 | 10/2004 | Lee | |

(Continued)

FOREIGN PATENT DOCUMENTS

EP    1361190 A1    11/2003

OTHER PUBLICATIONS

"U.S. Appl. No. 11/322,528, Non-Final Office Action mailed Sep. 10, 2008", 17 pgs.

(Continued)

*Primary Examiner*—W. B. Perkey
(74) *Attorney, Agent, or Firm*—Schwegman, Lundberg & Woessner, P.A.

(57) ABSTRACT

A system transports a device into a piece of industrial equipment for the purpose of collecting data inside of the industrial equipment. In an embodiment, the industrial equipment is a furnace and the device is an IR camera. The system opens a door covering an opening on the furnace, moves the IR camera inside of the furnace for a short time, the IR camera captures images, and the system removes the camera from the furnace and closes the door.

14 Claims, 6 Drawing Sheets

U.S. PATENT DOCUMENTS

2005/0018074 A1 1/2005 Nakamoto et al.
2007/0154205 A1 7/2007 Kocanda et al.

OTHER PUBLICATIONS

"U.S. Appl. No. 11/322,528, Response filed Dec. 8, 2008 to Non-Final Office Action mailed Sep. 10, 2008", 7 pgs.

"U.S. Appl. No. 11/322,528, Response filed Jul. 30, 2008 to Restriction Requirement mailed Jul. 10, 2008", 5 pgs.

"U.S. Appl. No. 11/322,528, Non-Final Office Action mailed Jun. 12, 2009", 7 pgs.

"U.S. Appl. No. 11/322,528, Response filed Apr. 23, 2009 to Final Office Action mailed Feb. 25, 2009", 9 pgs.

"U.S. Appl. No. 11/322,528, Response filed Jul. 30, 2008 to Restriction Requirement mailed Jul. 10, 2008", 5 pgs.

"U.S. Appl. No. 11/322,528, Response filed Sep. 10, 2009 to Non Final Office Action mailed Jun. 12, 2009", 5 pgs.

"U.S. Appl. No. 11/322,528, Restriction Requirement mailed Jul. 10, 2008", 5 pgs.

Flir Systems, "ThermaCAM® A Series Infrared Cameras—Process & Control Monitoring", http://www.flirthermography.com/cameras/series/1005/, (2003), 2 pages.

Mikron Infrared, "MikroScan 7302—Fixed-Installation Thermal Imaging Camera for Industrial and Scientific Applications", *Datasheet*, http://www.mikroninfrared.com/literature/7302datasheet.pdf, (Mar. 29, 2005), 2 pages.

NEC SAN-EI Instruments, "Fixed Installation Type Infrared Thermal Imager—Thermo Tracer TS7302", http://www.necsan-ei.co.jp/osd/thermography/ts7302.htm, (Copyright(C) 1998-2005), 3 pages.

NEC SAN-EI Instruments, "Thermal Imaging Camera for Tubes of Heating Furnace—Model TH7102WB", http://www.metrum.co.uk/images/TH7102WB.pdf, (no date listed), 2 pages.

"U.S. Appl. No. 11/322,528 Notice of Allowance Mailed Oct. 30, 2009", 3.

\* cited by examiner

TRANSPORT SYSTEM FOR MONITORING INDUSTRIAL PROCESSES

CROSS-REFERENCE TO RELATED APPLICATION

This application is a divisional of U.S. patent application Ser. No. 11/322,528, filed Dec. 30, 2005, now U.S. Pat. No. 7,641,402 which application is incorporated herein by reference.

TECHNICAL FIELD

The invention relates to systems and methods for introducing and withdrawing equipment into an environment, and in particular, introducing and withdrawing a camera into a high temperature environment.

BACKGROUND

Industrial processes should be closely monitored so that all process parameters can be verified as being within specification. This monitoring can take on many forms, and usually falls into two broad categories. Physical inspection and monitoring by humans, or physical inspection and monitoring by computer systems. In both cases, inspections and monitoring are aided by many other pieces of equipment such as all types of sensors (temperature, air quality, viscosity, density, visual appearance, etc.).

In some situations however, the environment that must be monitored is too harsh and extreme for either a human or a standard device or piece of equipment. Harsh and extreme environments include high temperature environments such as the inside of a furnace, caustic chemical environments, and high pressure environments. The extremes of these environments however do not lessen the need for the monitoring of the industrial process. Consequently, industries would benefit from a system that could monitor industrial processes under extreme conditions.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
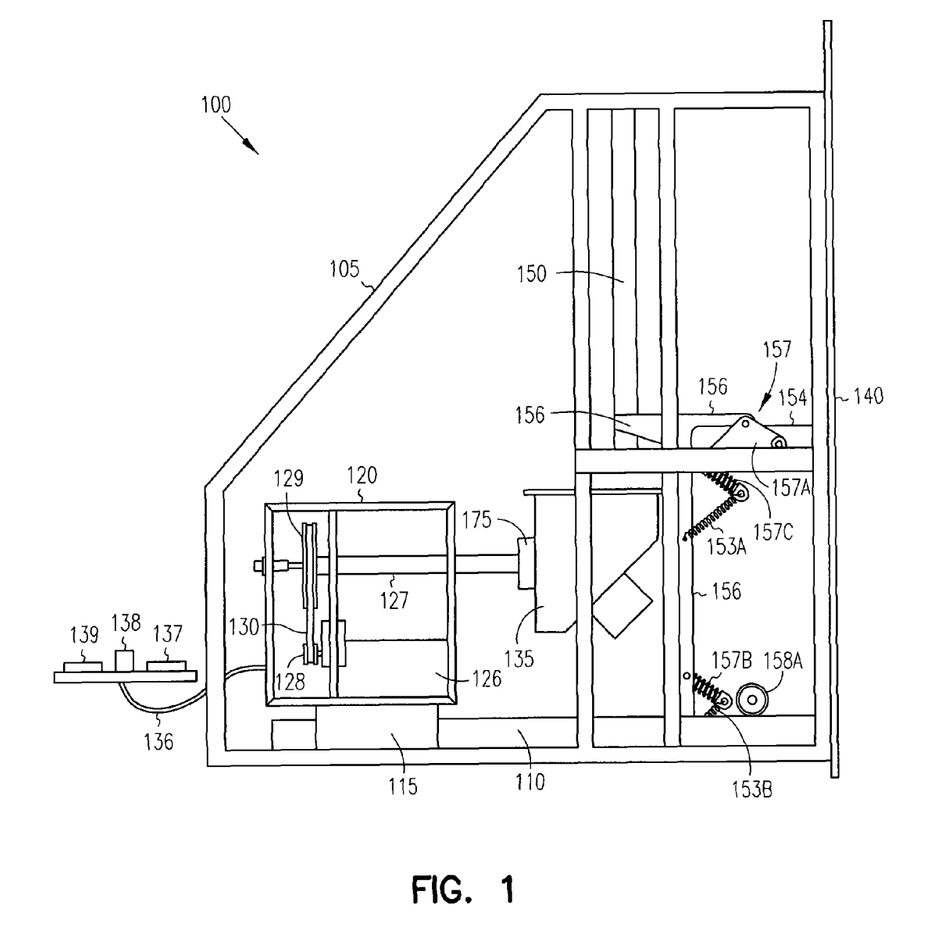
FIG. 1 illustrates an example embodiment of a transport system in a home position.
Figure 2:
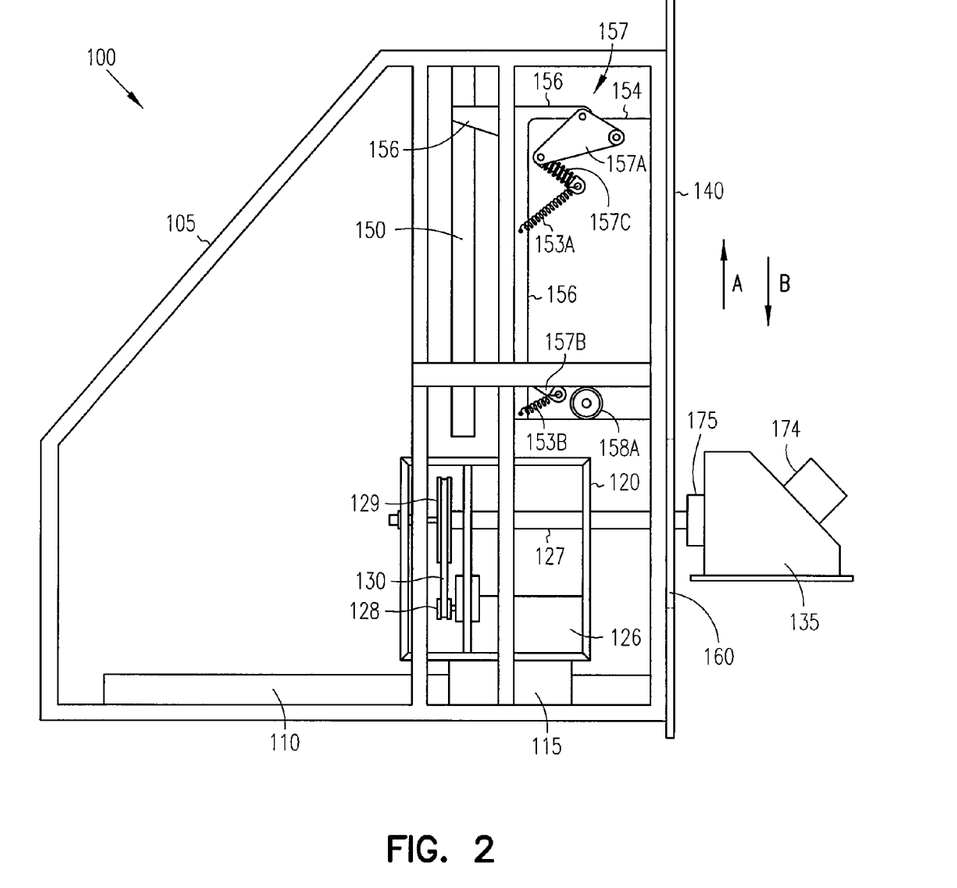
FIG. 2 illustrates an example embodiment of a transport system in a deployed position.

FIGS. 1 and 2 illustrate an embodiment of a transport system that moves a visible and/or an infrared (IR) camera enclosed in an industrial housing along a rail. While the embodiment of FIGS. 1 and 2 show a transport system of the invention in connection with an IR camera, those of skill in the art will readily realize that the invention is not limited to an IR camera, but that embodiments of the transport system of FIGS. 1 and 2 could also transport other pieces of equipment as well. Additionally, while the embodiment of FIG. 1 is discussed in connection with an industrial furnace, those of skill in the art will readily realize that the transport system of FIGS. 1 and 2 can be used in connection with other pieces of industrial equipment also. Moreover, while the transport system of FIGS. 1 and 2 is described as operating with a pneumatic system, one of skill in the art will realize that other means of powering the transport system such as electric powered motors in combination with gears, belts, chains, and/or pulleys could also be used.

The support and transport structure 100 of FIG. 1 has a frame 105. Attached to the frame 105 is a first motion transport system. In an embodiment, the first motion transport system is a pneumatic transport system that consists of a rail 110 and a trolley structure 115. In another embodiment, the rail 110 is one that is manufactured by Tol-o-matic® of Hamel, Minn. In an embodiment, the frame 105 is attached to the outside of the wall of an industrial housing 140, and the pneumatic transport system is attached to the frame 105. In one particular embodiment, the wall of the industrial housing 140 is an outside wall of a furnace. Positioned on top of the trolley structure 115 is an enclosure 120. The enclosure 120 contains a stepper motor 126 and a shaft 127. The stepper motor and shaft have wheels 128, 129 attached thereto respectively, and wheels 128, 129 are coupled via a belt, a chain, a gearing system or other means 130. (See FIG. 2).

Figure 1A:
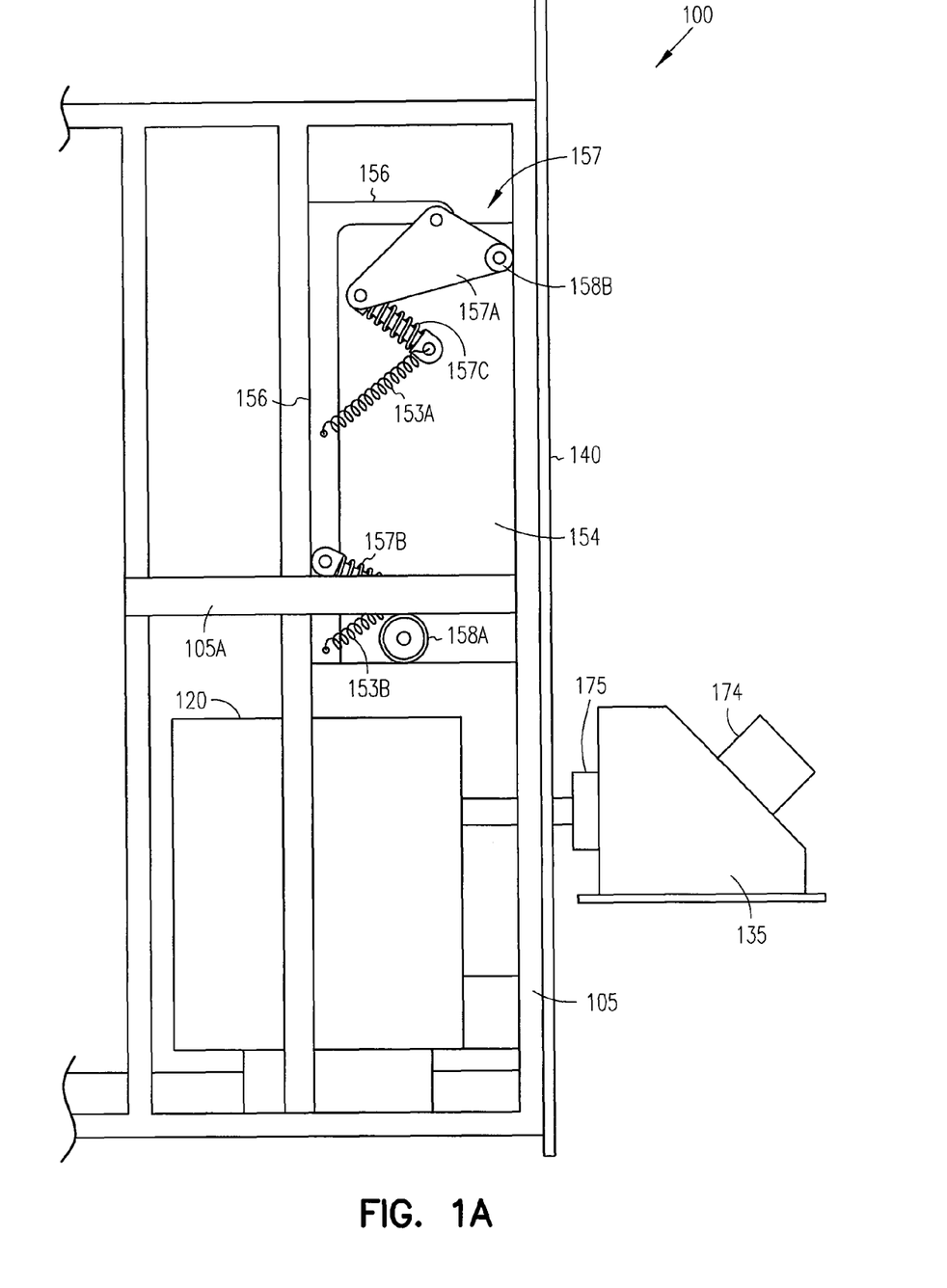
FIG. 1a illustrates a detailed view of an embodiment of a mechanical actuator, in a compressed mode, that can be used in connection with an example embodiment of the invention.
Figure 2A:
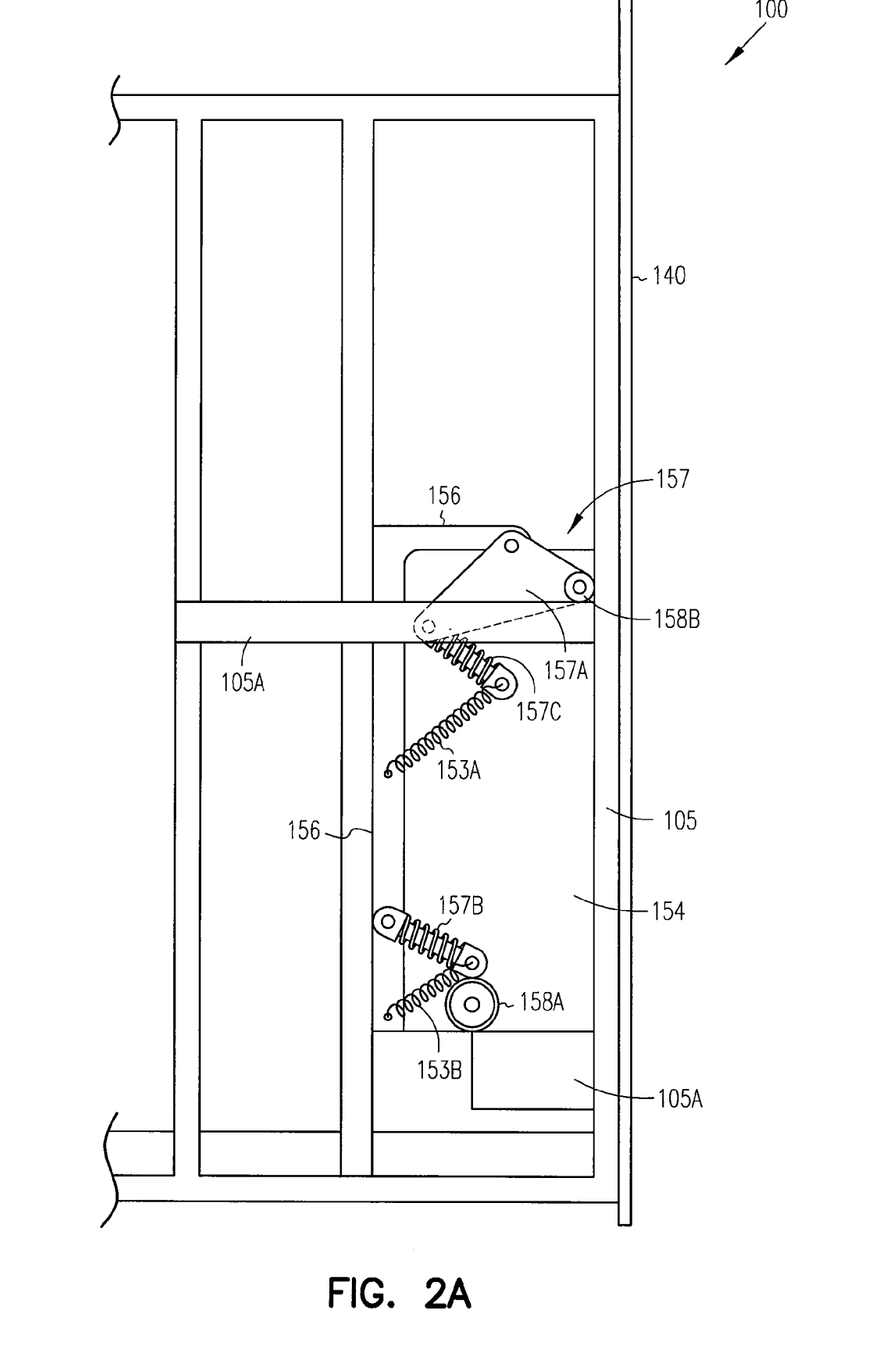
FIG. 2a illustrates a detailed view of an embodiment of a mechanical actuator, in expanded mode, that can be used in connection with an example embodiment of the invention.

Connected to the enclosure 120 via a cable 136 is a control box 137 that houses a control processor and electrical and pneumatic controls. Also attached to the control box 137 is a reservoir 138 for the storage of pneumatic air. A second industrial housing 135 is connected to the end of shaft 127 opposite that of the wheel 129. In an embodiment, the industrial housing 135 encloses a camera, such as an IR camera. Also attached to the frame 105 is a second motion transport system that, like the first motion transport system, may be a pneumatic transport system. In the embodiment of FIG. 1, such a pneumatic transport system has a rail 150, a second trolley structure 156, and a door 154. The second trolley structure is attached to the door 154 with attachments 157 and tension springs 153 that attach the door 154 to the pneumatic transport system via a door trolley structure 156. The door trolley 156 in FIGS. 1 and 2 is depicted in generic form to indicate that several connecting mechanisms known in the art could be used to connect the door 154 to the trolley structure 156. In one particular embodiment, the details of which are illustrated in FIGS. 1a and 2a, the attachment 157 includes a triangular bracket 157a and a roller 158b to connect the bracket 157a to the trolley structure 156. The door covers an opening 160 in the industrial housing wall 140 (FIG. 2).

Figure 3:
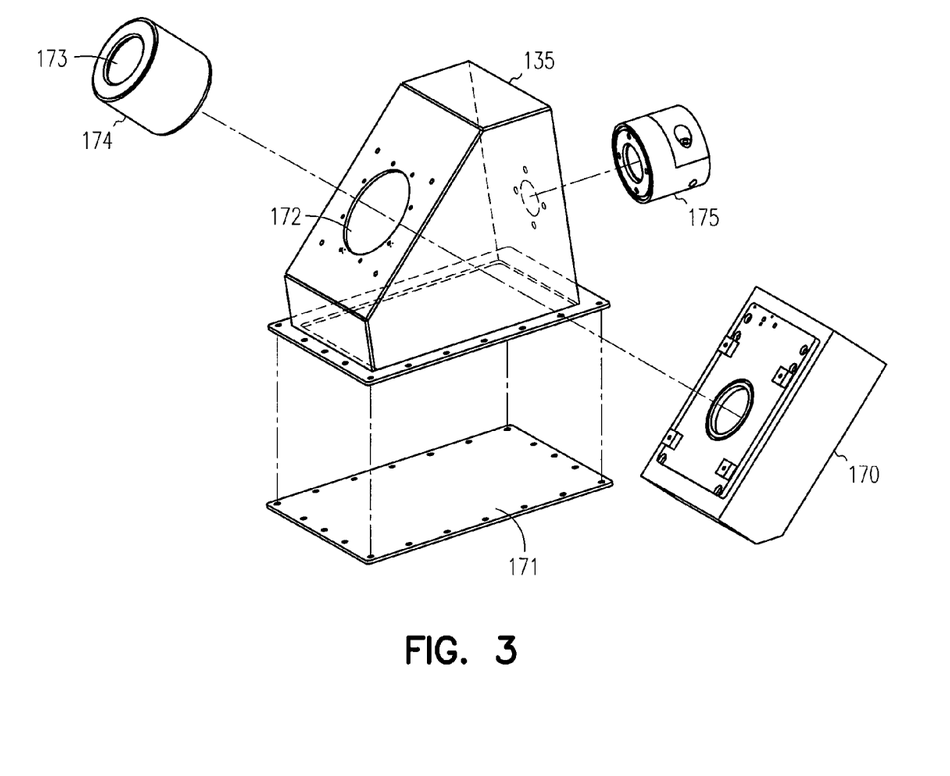
FIG. 3 is an exploded view of an industrial camera and housing that can be used in connection with an example embodiment of the invention.

The transport system 100 supports and transports the industrial housing 135 into and out of an industrial environment. In an embodiment, the industrial environment is a furnace, and the industrial housing 135 encloses an IR camera. An exploded view of an embodiment of an industrial housing 135 and an IR camera is illustrated in FIG. 3. The housing 135 has a bottom plate 171, and encloses a camera 170. An opening 172 receives the camera lens (not shown in FIG. 3) that is attached to the camera 170. The camera lens is enclosed and protected by a window 173 and lens housing 174 that is attached to the industrial housing. A coupling unit 175 attaches onto the housing wall, and serves to connect the housing 135 to the shaft 127. In an embodiment, the industrial housing 135 is manufactured out of hardened stainless steel, and the window 173 is made out of sapphire. In different embodiments, the lens attached to the camera may be a wide angle lens, a narrow angle lens, and/or a telescoping lens.

Referring now to FIG. 2, the door 154 has been moved in the direction of arrow A. As will be explained in detail in connection with FIG. 4, the movement of the door along arrow A occurs by activating the second pneumatic transport system, which moves door trolley 156 and the door 154 along rail 150, thereby exposing opening 160 in the industrial wall 140. Referring now to FIG. 2A, in an embodiment, attachments 157 A&B and tension springs 153 A&B secure the door 154 to the door trolley 156. The attachment 157 between door trolley 156 and the door 154 has compression springs 157C to ensure a tight seal between the door 154 and the wall 140 when the door trolley 156 is in the lowered position. Tension springs 153 A&B between door 154 and door trolley 156 is to ensure the door is held against the door trolley and away from the wall 140 when the door trolley is in the upper position. When the door trolley 156 first begins to rise, the compression spring force of attachments 157 A&B releases and tension springs 153 A&B pull door 154 toward door trolley 156 and away from the wall 140. This ensures that there is no interference between the door 154 and the wall 140 or other structure. As the door trolley 156 continues to raise, both the door trolley 156 and door 154 move in the direction of arrow A. When the door 154 and door trolley 156 are lowered by activating the second pneumatic transport system, the door first moves with the door trolley down in the direction of arrow B until roller 158A, which is fixed to door 154, contacts the horizontal portion of the frame 105a. The trolley 156 continues to move down while the door 154 can not, causing compression spring loaded attachment 157B to move the door toward the industrial wall 140. The detail of the attachment 157B, roller 158A and tension spring 153B is illustrated in FIGS. 1a and 2a. Referring to FIG. 1a, as the door trolley 156 is moved down by the second pneumatic transport system with the roller 158B preventing any further movement in the direction of arrow B, attachment 157A pushes the door 154 away from the door trolley 156 toward wall 140. When the door trolley 156 is raised by the second pneumatic system, the tension spring 153A first pulls the door 154 back away from the industrial wall 140 and then door trolley 156 and door 154 move together in the direction of arrow A. In situations in which the industrial housing 140 is cylindrical-like in shape, or the surface of a flat housing wall is not perfectly planar, an adapter can be welded or otherwise coupled onto the wall of the industrial housing. The surface of the adapter that contacts the door 154 can then be machined to accurately mate with the door.

FIG. 2 further shows that enclosure 120, shaft 127, and housing 135 have been moved along rail 110 via the activation of the first pneumatic transport system. The housing 135 itself has been moved through opening 160 into the industrial housing 140. FIG. 2 further illustrates that the industrial housing 135 has been rotated from a home position as illustrated in FIG. 1 (as determined by the direction that the window 173 and lens housing 174 is pointed), to a deployed position as illustrated in FIG. 2. In another embodiment, the industrial housing is attached to the shaft 127 by a mechanism that allows the industrial housing 135 to tilt when it is in the industrial housing 140.

Figure 4:
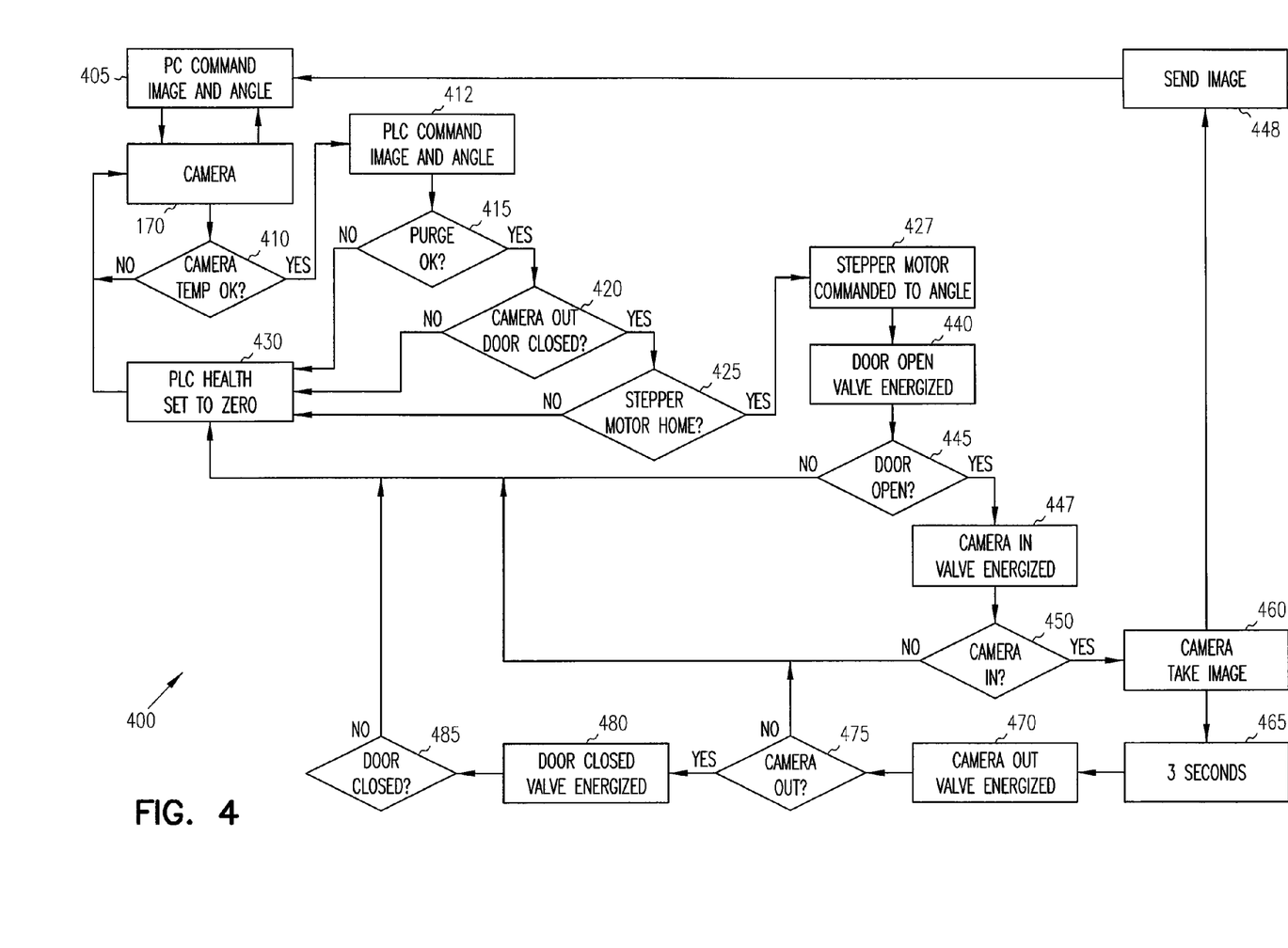
FIG. 4 illustrates a flowchart of a process control that can be used in connection with an example embodiment of the invention.

In an embodiment, the transport structure 100 is connected to a processor housed in control box 137 that controls the functions of the transport system 100. A flowchart outlining an embodiment of the control process is illustrated in FIG. 4. In FIG. 4, the control process 400 at block 405 (a process control computer) transmits a signal to the camera 170 to determine the temperature of the camera. If the temperature of the camera is too high, for example because of a recent incursion into a furnace, the process control will not move the camera into the furnace. In one embodiment, a timed loop is programmed into the processor logic to poll the temperature again, and see if the temperature is low enough to be inserted into the furnace. In other embodiments, the insertion of the camera is on a timed and scheduled basis, and the system then waits for the next scheduled time to insert the camera into the furnace. In yet another embodiment, an operator provides a command to the processor to move the camera into the furnace, and if insertion does not occur because the temperature of the camera is too high, the operator can wait before reissuing the command.

In an embodiment, if the temperature of the camera is found to be within operating conditions in block 410, image and rotation angle commands are transmitted from the camera to a programmable logic controller (PLC) housed in control box 137 (block 412). The image command readies the IR camera 170 for capturing images, and the rotation command is sent to the PLC which communicates with the stepper motor controller, housed in control box 137, which rotates the camera so that the window 173 and lens housing 174 will be pointed in the desired direction at 427. At 415, the PLC checks to see if the industrial housing 135, the enclosure 120, and the control box 137 have been successfully purged. A purge system 139, housed in control box 137, establishes a positive pressure in the enclosure 120, the control box 137, and the housing 135. This positive pressure keeps contaminants from leaking into these structures. If the Purge is OK, the PLC then checks in block 420 whether the camera 135 is out and the door 154 is closed. If the camera is out and the door 154 to the housing 140 is closed, the PLC checks in block 425 to see if the camera window 173 and lens housing 174 are located in the home position. If the camera is home, signals are then sent to the stepper motor at 427 so that the camera is rotated the desired number of degrees to the desired angle (i.e. the deployed position). If the purge was not OK in block 415, or the camera was not out and/or the door was not closed in block 420, or the stepper motor was not in a home position in block 425, a variable representing the health or status of the PLC is set to zero and sent to the camera in block 430, and the camera communicates a PLC health error indication to the process computer.

In block 440, the processor sends a signal to energize a pneumatic valve which opens the door 154 that seals the housing 140. In block 445, the processor checks to see if the door successfully opened. If the door did not open successfully, the PLC health status is set to zero at 430, and the PLC sends the information to the camera. If the door successfully opened, the first pneumatic transport system is energized at 447, and the housing 135 and camera 170 are moved through the housing wall 140. The processor then determines if the camera was moved into the housing successfully at 450. If it was not, the PLC status is once again set to zero. If the processor determines that the camera was moved into the furnace successfully, images are captured by the camera at 460. The camera then communicates with the process computer in block 405 and transfers the images. These images may be transmitted via wired or unwired means. Then, after a short time in the furnace at 465 (three seconds in one embodiment), the PLC sends a signal to the first pneumatic transport system at 470 to energize the valve again so that the housing and camera are removed from the furnace. The PLC checks to see if the camera was successfully removed from the furnace at 475. If it was not, the PLC status is set to zero. If the camera was successfully removed from the furnace, the close door valve of the second pneumatic transport system is reenergized at 480, and the door 154 is closed. The PLC checks to see if the door was successfully closed (485), and if it was not, PLC status is set to zero.

When the transport system senses any of the problems outlined above (e.g. the door 154 did not successfully close at 485), or any other problems such as loss of electrical power or loss of pneumatic pressure, the processor status is set to zero and the system goes into a failsafe state. If instrument air is lost in the failsafe state, the pneumatic air in the reservoir 138 is used by the system to remove the camera from the furnace (if the camera is in the furnace when the problem occurs), and to shut the door 154 (if once again the door is open when the problem occurs). This failsafe operation prevents the situation where the furnace door remains open because of a failure of some part of the system. In an embodiment that uses an electric motor to move said industrial housing 135 and said door 154, an alternative power supply, such as a battery or gas-powered generator, could be used to put the system into the failsafe mode.

In the foregoing detailed description of embodiments of the invention, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The invention claimed is:

1. An apparatus comprising:
    a frame, a first rail, and a second rail, said frame, said first rail and said second rail attached to a piece of industrial equipment;
    a motor slidably coupled to said first rail;
    a door slidably coupled to said second rail, said door for covering an opening on said industrial equipment;
    a shaft coupled to said motor;
    an industrial housing attached to said shaft;
    means to move said motor along said first rail and means to move said door along said second rail; and
    a processor and a programmable logic controller, said processor and programmable logic controller coupled to said motor, said door, said means to move said motor along said first rail, and said means to move said door along said second rail.

2. The apparatus of claim 1, wherein said means to move said motor along said first rail and said means to move said door along said second rail comprise a pneumatic system.

3. The apparatus of claim 1, wherein said means to move said motor along said first rail and said means to move said door along said second rail comprise an electric motor and gear system.

4. The apparatus of claim 1, further comprising an infrared camera positioned within said industrial housing.

5. The apparatus of claim 1, wherein said industrial equipment comprises a furnace.

6. An apparatus comprising:
    a frame;
    a first pneumatic system attached to said frame;
    a second pneumatic system attached to said frame;
    a first industrial housing connected to said first pneumatic system; and
    a door connected to said second pneumatic system;
    wherein the frame is configured for direct attachment to a second industrial plant-based, immobile industrial housing associated with an industrial process, such that the frame comes into direct contact with the second industrial plant-based, immobile industrial housing.

7. The apparatus of claim 6, further comprising the second industrial plant-based, immobile industrial housing.

8. The apparatus of claim 6, further comprising a motor, said motor connected to said first pneumatic system and said first industrial housing.

9. The apparatus of claim 8, further comprising a shaft, said shaft connecting said motor to said first industrial housing.

10. The apparatus of claim 8, further comprising:
    a programmable logic controller coupled to said first pneumatic system and said second pneumatic system, said processor housed in a control box;
    an enclosure to house said motor; and
    a purge system to establish a positive pressure within said control box, said enclosure that houses said motor, and said first industrial housing.

11. The apparatus of claim 6, wherein said industrial plant-based, immobile industrial housing comprises a furnace.

12. The apparatus of claim 6, further comprising a camera contained within said first industrial housing.

13. The apparatus of claim 6, further comprising:
    a second frame attached to said second pneumatic system; and
    an actuator connecting said second frame to said door;
    wherein said second pneumatic system causes said door to move in a first direction and said actuator causes said door to move away from said industrial equipment; and
    further wherein said second pneumatic system causes said door to move in a second direction and said actuator causes said door to move towards said industrial equipment.

14. The apparatus of claim 12, wherein said camera comprises an infrared camera, a wide angle lens, and a sapphire window.

* * * * *